United States Patent Office 3,240,824
Patented Mar. 15, 1966

3,240,824
PROCESS FOR PREPARING FLUORONITRO-
BENZENES
Max M. Boudakian, Hamden, and Eugene R. Shipkowski, Wallingford, Conn., assignors to Olin Mathieson Chemical Corporation, New Haven, Conn., a corporation of Virginia
No Drawing. Filed Jan. 28, 1965, Ser. No. 428,832
4 Claims. (Cl. 260—646)

This invention relates to an improved process for the preparation of o- and p-fluoronitrobenzenes.

o- and p-Fluoronitrobenzenes, which are usually prepared by the fluorination of the corresponding chloronitrobenzenes, are valuable intermediates in the chemical industry since they are reduced to provide fluoroanilines which are sold in commercial quantities for use in the production of dyestuffs, antifouling paints, germicides, soldering fluxes and numerous other industrial products.

It is known that unactivated aryl chlorides do not undergo the exchange reactions with inorganic fluorides which are common with, for example, aliphatic chlorides. However, it is also known that chlorobenzenes having substituted nitro groups undergo these exchange reactions with inorganic fluorides under various reaction conditions to provide fluoronitrobenzenes, and this enhanced reactivity has been attributed to the activating effect of the nitro substituents.

In this regard it has been established that dinitrochlorobenzenes are much more susceptible to the fluorination process than mononitrochlorobenzenes. For instance, it has been reported by G. C. Finger et al. in J. Am. Chem. Soc., 78, 6034 (1956) that 2,4-dinitrochlorobenzene readily reacts with anhydrous potassium fluoride in a nitrobenzene solvent to provide 2,4-dinitrofluorobenzene, and a similar reaction is reported to have been performed even without a solvent.

However the reaction of the less highly activated mononitrochlorobenzenes with inorganic fluorides to provide the corresponding fluorinated derivatives is much more difficult to perform, and to date reactions of this nature utilizing the commonly employed alkali metal fluoride reactants have only been performed in the presence of a suitable polar solvent. For example, Finger et al., supra, and K. Fukui et al. in Nippon Kagaku Zasshi, 79, 889–94 (1958) [CA 54, 4430 (1960)] have reported that reactions of this nature have been performed in the presence of polar solvents such as dimethylformamide and dimethylsulfoxide. More recently, Duesel et al. in U.S. Patent 3,064,058 have disclosed that tetramethylene sulfone is a useful solvent in these fluorination procedures.

It has been reported by N. N. Vorozhtsov et al. in Khim. Nauka i Prom. 3, 403 (1958) [CA 52, 19988 (1958)] that cesium fluoride can be used in the fluorination of mononitrochlorobenzenes to provide fluoronitrobenzenes in the absence of a solvent. However the use of this costly fluorinating agent in a commercial scale operation is not feasible due to the prohibitive expense of this material relative to the cost of the commonly employed inorganic fluorides such as sodium and potassium fluorides.

Thus, when the commonly employed sodium and potassium fluorides have been utilized in the fluorination of mononitrochlorobenzenes, it has been heretofore necessary to employ in the process polar solvents of the type previously described. Naturally in the preparation of o- and p-fluoronitrobenzenes, these solvents must be recovered and recycled for subsequent reuse, and this operation adds substantially to the cost of preparing those fluoronitrobenzenes. Aside from the tedious and time consuming recovery procedures, it has been found that approximately 10% of the solvent is lost after each fluorination. Furthermore, the fluorinations must be carried out in anhydrous media, and since these polar solvents have a strong affinity for water, the removal of small amounts of water from these solvents is particularly difficult and requires refined distillation techniques.

The principal object of this invention is to provide an improved process for the preparation of mononitrofluorobenzenes. Another object of this invention is to provide a fluorination technique which is particularly suitable for the economical preparation of commercial quantities of mononitrofluorobenzenes. Still another object of this invention is to provide a process wherein o-chloronitrobenzene and p-chloronitrobenzene are reacted with an inexpensive inorganic fluoride in the absence of a solvent to provide o- and p-fluoronitrobenzenes in good yield.

These objects have been accomplished in accordance with this invention. It has now been found that o-chloronitrobenzene and p-chloronitrobenzene react with anhydrous potassium fluoride at a selected reaction temperature range to provide o-fluoronitrobenzene and p-fluoronitrobenzene in good yield, and no diluent or solvent need be employed during this process. Thus the aforementioned problems relating to solvent recovery, recycling, etc., are obviated as a result of this invention. The preparation of o- and p-fluoronitrobenzenes by the solvent-free process described herein is a surprising and unexpected process feature, since Vorozhtsov et al., supra, have previously reported that o- and p-chloronitrobenzenes were inert to anhydrous potassium fluoride at elevated temperatures in the absence of a solvent.

The process of this invention must be carried out at the relatively narrow temperature range of about 270°–320° C. At a lower temperature, fluorination either does not occur or proceeds at an impractical rate. On the other hand, significant decomposition of the reactants and products occurs at a higher temperature. A preferred process embodiment comprises performing the fluorination described herein at 285°–300° C.

Equimolar amounts of the chloronitrobenzene and potassium fluoride are satisfactorily employed in the practice of this invention, and no improvement has been observed when a molar excess of either reactant is utilized. A mixture of o- and p-chloronitrobenzenes can be fluorinated by the disclosed process herein to provide a corresponding mixture of o- and p-fluoronitrobenzenes.

Upon completion of the fluorination procedure at the recited temperature range, the desired products are conveniently isolated. For example, the reaction mixture may be extracted with appropriate organic solvents such as ether, benzene, and the like, and the residual organic solution can be fractionally distilled to separate the desired fluoronitrobenzene from any residual quantities of chloronitrobenzene. Alternatively the reaction mixture may be distilled directly without performing the intermediate extraction technique.

Highest yields of fluoronitrobenzenes prepared by the novel process of this invention are obtained when the reactants are heated together at the specified temperature range for periods of from about 4–30 hours. However, the desired fluorinated derivatives are obtained when shorter reaction periods are utilized but in reduced yield.

The following examples are illustrative of the novel process of this invention.

Example 1

A mixture comprised of 10.0 g. (0.0635 mole) of o-chloronitrobenzene and 3.78 g. (0.0635 mole) of anhydrous potassium fluoride was placed in a dry heavy wall glass tube (carius tube). The tube was evacuated and sealed under vacuum. The sealed vessel was then placed in a horizontal tube furnace mounted on an oscillating shaker. The tube was heated to 290° C. while being vigorously shaken, and the temperature was maintained at 290° C. for 24 hours.

The tube was then cooled to room temperature, opened and the organic products were extracted with diethyl ether. The ether was then removed from the reaction mixture by distillation, and the residual organic materials were analyzed by vapor phase chromatography for o-chloronitrobenzene and o-fluoronitrobenzene content.

The analytical data revealed that o-fluoronitrobenzene had been obtained in 60.6% yield (corrected). This yield was based on a 50.5% conversion of o-chloronitrobenzene.

*Example 2*

Using conditions identical to those employed in Example 1, the reaction of 10.0 g. (0.0635 mole) of p-chloronitrobenzene and 3.78 g. (0.0635 mole) of anhydrous potassium fluoride resulted in a 56.5% (corrected) yield of p-fluoronitrobenzene. The yield was based on a 52.5% conversion of p-chloronitrobenzene.

What is claimed is:

1. A process for preparing o-fluoronitrobenzene and p-fluoronitrobenzene which comprises reacting a material selected from the class consisting of o-chloronitrobenzene, p-chloronitrobenzene and a mixture of said o-chloronitrobenzene and said p-chloronitrobenzene with anhydrous potassium fluoride at a temperature range of about 270° C. to about 320° C.

2. The process of claim 1 wherein a reaction temperature range of 285°–300° C. is employed.

3. The process of claim 1 wherein o-chloronitrobenzene is reacted with anhydrous potassium fluoride to provide o-fluoronitrobenzene.

4. The process of claim 1 wherein p-chloronitrobenzene is reacted with anhydrous potassium fluoride to provide p-fluoronitrobenzene.

References Cited by the Examiner

Vorozhtsov et al.: Chem. Abs., vol. 52, p. 19988 (1958).

LEON D. ROSDOL, *Primary Examiner.*

CARL D. QUARFORTH, *Examiner.*

L. A. SEBASTIAN, *Assistant Examiner.*